April 2, 1935.   J. BIJUR   1,996,060
LUBRICATING SYSTEM
Filed May 13, 1929   2 Sheets-Sheet 1
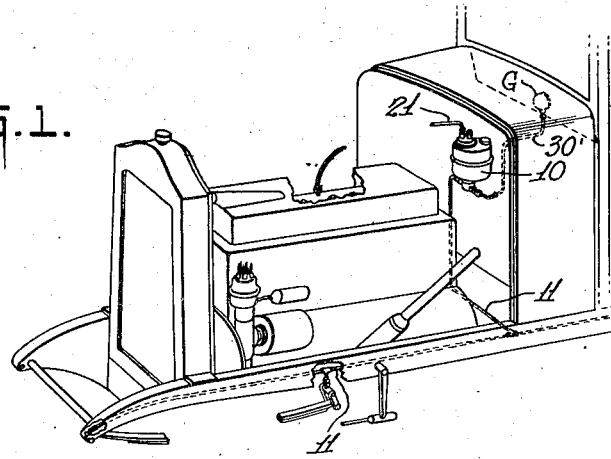
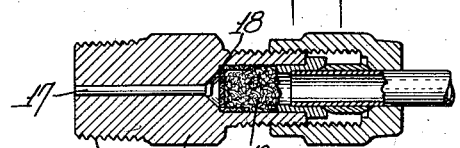
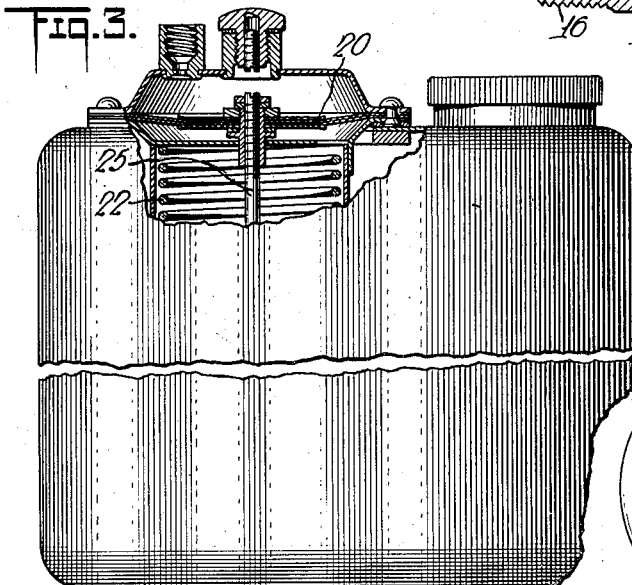
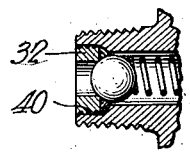
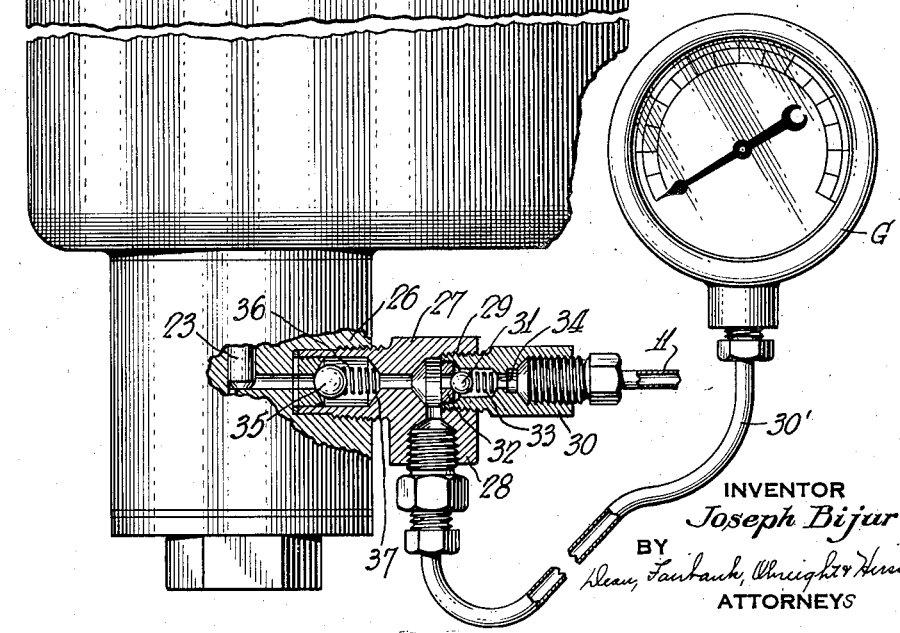
INVENTOR
Joseph Bijur
BY
ATTORNEYS

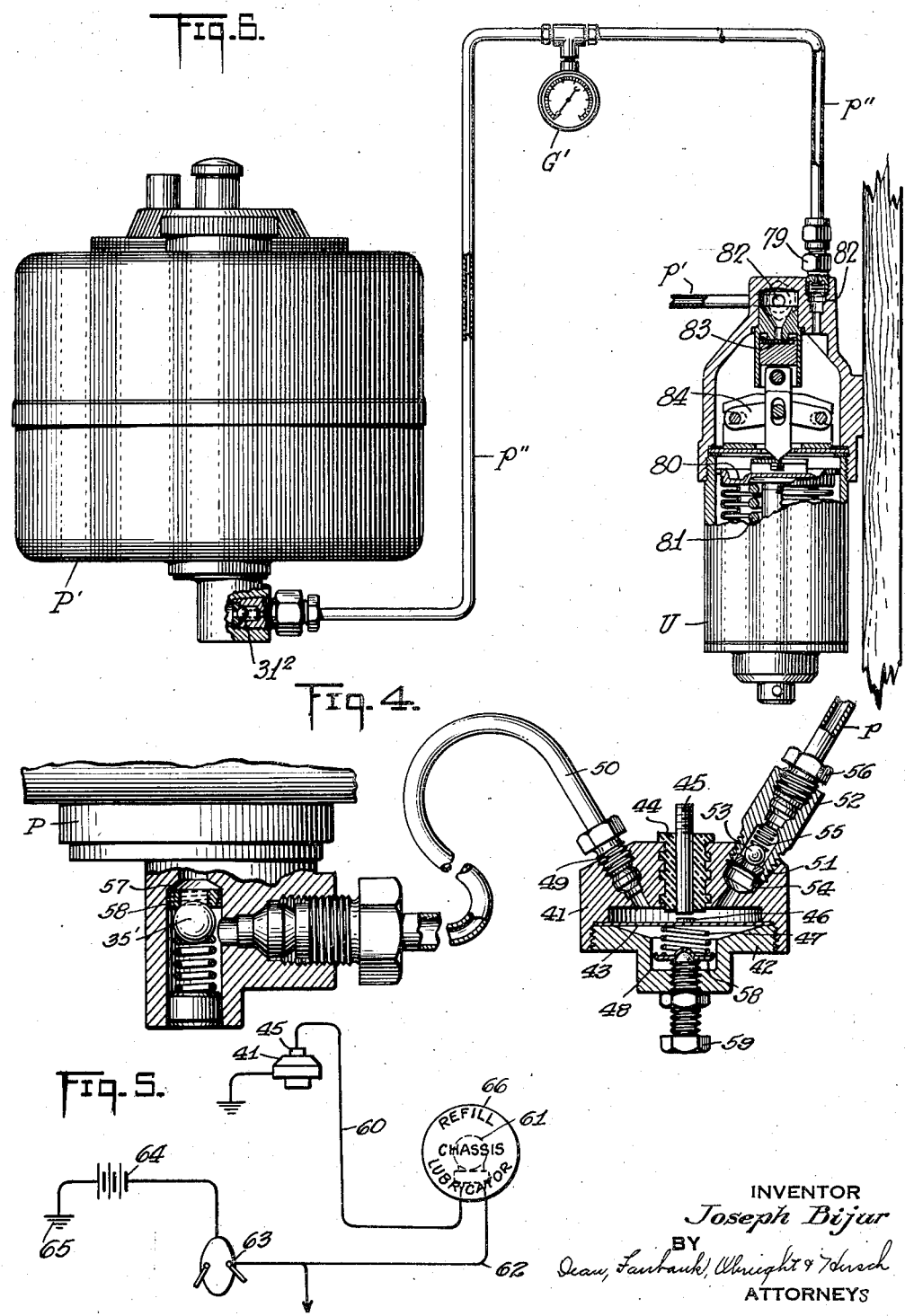

Patented Apr. 2, 1935

1,996,060

UNITED STATES PATENT OFFICE 1,996,060

LUBRICATING SYSTEM

Joseph Bijur, New York, N. Y., assignor to Auto Research Corporation, a corporation of Delaware Application May 13, 1929, Serial No. 362,567

28 Claims. (Cl. 184—7)

My present invention is concerned primarily with central lubricating systems, more particularly for motor vehicles, such as automobiles and while not limited thereto, it relates especially to automatically controlled systems, that is, to systems that feed lubricant to the bearings during the running of the vehicle, without the need for any conscious manipulation by the user.

A system of the above type, the operation of which requires no conscious operation or manipulation other than occasionally refilling a supply reservoir, is apt to be neglected even in this particular in the absence of some means automatically indicating depletion. Squeaks are only one manifestation of other difficulties resulting from allowing bearings to run without lubricant.

Dry bearings are apt to pick up or rub off brass from the bushings, so that the bolts, king pins, and similar parts may become scored or roughened and may also develop rust. If the dryness of the lubricating system is allowed to persist for longer periods, there is the additional risk that dust and dirt will accumulate in crevices or passages to such extent as to cake or block and thus prevent free passage of oil when the system is next replenished with lubricant. The various lubricated assemblies would then have to be taken apart and cleaned in order to insure reliable feed of lubricant to the bearing surfaces.

It is accordingly important that the lubricating system should at all times be kept filled and that the driver should receive effective warning when refilling becomes necessary.

Therefore it is an object of the invention to provide in a lubricating system and more particularly in an automatic feed lubricating system, means to give automatic notice of distinct or marked character easily perceived by the driver at the wheel without inspection of the reservoir itself.

Another object is to provide a pressure actuated indicator suitable for a continuous feed lubricating system of the type in which the propulsive pressure may be as low as a small fraction of a pound.

Another object is to provide an indicator of the above type that will accurately discriminate for all practical purposes between conditions of lubricant feed to the bearings and cessation of feed.

Another object is to provide apparatus or means of the above type of simple and inexpensive construction, dependable to give an indication or alarm upon depletion of lubricant, and to give no false indication, regardless of the varying conditions of vehicle operation, as long as a sufficient supply of lubricant remains.

Another object is to provide an indicator or alarm of the above type, the action of which shall not be impaired by heat, by moisture or by vibration.

Another objection is to provide a system of the above type, which when utilizing an electrically operated signal will avoid waste of battery current while the vehicle is out of use, and which will promptly resume indicating operativeness should the lubricant supply not be replenished by the time the vehicle is again put into service. Other objects are in part obvious and in part pointed out hereinafter.

A feature of the invention is to render the indicator responsive to pressure existing in some part of the lubricant distributing system throughout normal operation thereof. The indicator may be either of the pressure-gauge type or of the electric type, set into action by electric circuit closure under release of pressure due to lack of lubricant.

In one embodiment the pressure on a part of the system is artificially maintained during normal operation of the vehicle even though the distributing parts of the system are at the low pressure desirable for systems of the continuous feed type.

Preferably a spring-seated valve is interposed between the pump and the branched distributing system, said valve having a definite seating pressure and determining the pressure controlling the signal or indicator. Inasmuch as this valve in the absence of other precautions will maintain such pressure throughout, even though pumping operation proceed with the supply of lubricant exhausted, means is provided automatically and slowly to release such trapped pressure after operation has ceased. For this purpose, either the said loading valve or the outlet valve of the supply pump, is provided with a highly restricted bleeding aperture in its seat through which the relief occurs.

Where the indicator is of the electric type, its circuit is preferably interlocked with that of the ignition system so that relief of pressure by the bleeder will not cause signal operation after the vehicle has been put out of service, and drainage of the battery is thus avoided.

In operation accordingly, while the system is functioning properly the electric signal is maintained inactive by the counter-pressure due to the artificially loaded inlet of the distributing line. Should the supply of lubricant become depleted during the vehicle run, oil propulsion would cease, but the artificial load would maintain counter-pressure until relief thereof by leakage, whereupon the electric circuit would close to give a signal, sustained until after the engine had been stopped, or normal operation resumed, with the lubricant reservoir refilled.

In the application to a system of the shot feed type the outlet valve of an accumulator is snapped open upon completion of its charge from the pump, to allow the accumulator spring to eject the effective charge into the distributing system and then to snap the outlet valve closed.

In this embodiment the counter-pressure caused by the accumulator, brings about the gauge or electric signal indication or alarm, without the need for a distinct loading valve.

In the accompanying drawings in which are shown one or more of various possible embodiments of the several features of this invention, Fig. 1 is a perspective view showing a fragment of one type of installation applied to a continuous feed system.

Fig. 2 is a view in longitudinal cross section of a preferred form or drip plug used with the embodiment of Fig. 1.

Fig. 3 is a view in side elevation, with parts broken away and in section, showing a construction of automatic pump unit and gauge construction employed in the embodiment of Fig. 1.

Fig. 3a is a sectional view of a detail of Fig. 3 on a larger scale.

Fig. 4 is a diagrammatic view showing another embodiment, parts appearing in section, others broken away.

Fig. 5 is a diagram of circuit connection in the embodiment of Fig. 4, and

Fig. 6 is a diagrammatic view showing parts in detail of an application of the invention to an intermittent or shot feed system.

In Fig. 1 of the drawings there is indicated diagrammatically an automatic lubricating system including a lubricant reservoir 10 illustratively mounted at the front of the dashboard and feeding a distributing system, a fragment of which appears at 11. Since the specific arrangement by which automaticity is effected is not material to the invention herein claimed, I have for the sake of clearness illustratively indicated in a purely diagrammatic manner only one of various possible arrangements for attaining this action.

In Figs. 1 and 3 is shown an embodiment more particularly suited for a central lubricating system of the continuous feed as distinguished from one of the intermittent or shot feed type. The pump is here actuated at frequent intervals to feed a repeated succession of minute charges into the pipe line to the bearings. The outlets in this embodiment may be of the restriction or drip plug type and these drip plugs may be either devoid of valves or have suction seated valves of the type shown, for instance, in my patents Nos. 1,732,212 and 1,746,139.

The drip plug comprises a fitting 15 with a threaded end 16 for application at the bearing. High resistance to flow is determined by a pin 17 nearly filling a longitudinal bore in the fitting, and headed as at 18 to be maintained in place. A strainer plug 19 at the inlet not only prevents the crevice determined by the pin from clogging, but keeps the pin in place.

The reservoir of Fig. 3 illustratively includes a diaphragm 20 near the upper end thereof connected by a pipe 21 for application thereat of suction from the intake manifold of the engine. The pump plunger 23 extends downward into pump block 26 is connected by rod 25 to diaphragm 20 and is lifted for pump charge by upward flexure of the diaphragm, and caused to discharge by expansion of the spring 22 which is stressed in such upward flexure.

In the present embodiment the pump block 26 protrudes below the reservoir and has a lateral elbow outlet fitting 27 therein, to the arm 28 of which pipe line 30' is connected which leads to the pressure gauge G. A second fitting 30 is affixed in an end socket 29 of fitting 27 and feeds to the distributing piping 11.

The outlet fitting 30 is preferably provided with a ball outlet check valve 31 urged against inserted seat piece 32 by a coil spring 33 reacting against a shoulder 34 within the fitting.

The pump outlet may be provided with a check valve 35 illustratively a ball in the stem of elbow fitting 27 and urged against its seat by a coil spring 36 reacting against shoulder 37, said valve preventing suction in the line 30' in the charging stroke of the pump.

The outlet check valve 31 being seated with a spring pressure say of 20 pounds, it exerts a corresponding counter pressure when overcome by the pump during feed of lubricant to the distributing system. The gauge G responding to the pressure exerted against valve 31 will register a substantial pressure of 20 pounds or more throughout normal operation of the vehicle. This registration will be maintained even though a substantial interval occur between successive strokes of the pump during normal operation of the vehicle, and the gauge G accordingly will show no violent fluctuation, though the pump operate at irregular intervals.

In the absence of other precautions the pressure sustained in the pump block passages would remain at all times at the value determined by the loading valve, showing safety condition, due to the pressure trap, and even though the supply of lubricant in the reservoir had been depleted. Accordingly, the valve seat insert 32 is provided with a vent, illustratively a highly restricted peripheral groove 40 determining a resistant helical passage which will slowly relieve the pressure otherwise maintained by the spring-seated check valve, so that after a period of say from 5 minutes to an hour, the pressure in the passages of the pump block 26 will have been relieved and the gauge G will return to a low-reading position.

Thus, even with the reservoir fully charged with lubricant, the gauge will, nevertheless, return to low reading or zero position after the vehicle has been left out of service, say overnight. When the vehicle is again run but a short while, the lubricant pressure will build up and the gauge will show the normal operative reading. The failure of the gauge quickly to pick up indicates the need for replenishment. If during the run of the vehicle, the lubricant should give out, this will be indicated by the falling off or dropping of the gauge-reading within a few minutes after effective pumping has ceased, that is, upon relief due to bleeding past the helical groove 40.

The pressure in the pipe system causing the substantially continuous emission to the bearings may vary with the system shown from but a few ounces in summer to ten or more pounds in cold weather.

The volume discharged by pump 23 is so small and the force exerted by spring 22 so high, that the discharge takes place relatively rapidly even when the oil becomes viscous in winter use. The counter pressure to pass oil by the ball 35 is low compared to that capable of being generated by the pump. Accordingly the system operates for nearly the same rate of feed to the bearings, under the usual range of climatic variation. Said valve however maintains the pressure requisite for effective gauge reading, notwithstanding the variability of pressure in the distributing line and the extremely low values to which such pressure may drop.

In Fig. 4 is shown an application of the invention to an electric instead of a pressure gauge indicator. Instead of the gauge I have in this embodiment shown an electric circuit closer unit comprising a casing 41 having a cover 42 screwed thereinto and clamping the periphery of a diaphragm 43 in place. Centrally through the base of the case is an insulating bushing 44 through which extends an electric terminal post 45, the inner contact end of which coacts with a contact stud 46 in the middle of the diaphragm. A coil spring 47 in a corresponding socket 48 in the cover urges the diaphragm to circuit closing position. A mounting screw 59 through the cover 42 abuts a washer 58 sustaining the spring 47 so that by adjustment of screw 59 the tension of spring 47 may be regulated.

The case has a pressure inlet socket 49 into which is screwed the terminal of the pipe section 50 leading from the pump P. A pressure outlet socket 51 in the case 41 is connected to the inlet of the distributing system $p$.

The inlet to the chassis piping is controlled by a counter pressure valve unit generally similar to that of Fig. 3. The unit as shown includes a fitting 52 screwed into the socket 51, having a ball valve 53 urged against its seat 54 by spring 55 and affording a coupling connection to the end of pipe $p$ at 56.

In pump operation the valve 53 is overcome, for emission to the distributing pipe therebeyond and regardless how low the pressure in said distributing system, valve 53 sustains pressure during the continued operation of the pump, whereby the diaphragm 43 is deflected to open circuit as shown.

In the absence of other precautions this pressure would be sustained and the circuit closer maintained open due to the trapping of lubricant under pressure by the valve 53 so that there would be no indication even though the pump continued operating without lubricant in the reservoir.

Accordingly, a restricted bleeder is provided for the pressure trap. In this embodiment I have illustratively shown the bleeder not at the counter pressure valve 53 but at the seat of the check valve 35' (illustratively shown aligned with the pump piston) through which the pipe length 50 is fed by the pump. The seat 57 of the valve 35' is provided with a peripheral helical groove 58 substantially as in Fig. 3.

The control of the signal from the circuit closer 41 is shown in the circuit diagram of Fig. 5. The case 41 is grounded and the binding post 45 is connected by a lead wire 60 to one terminal of an electric lamp 61 preferably at the dashboard, the other terminal of which is connected by lead wire 62 to one terminal of the ignition switch 63 the other terminal of which is, of course, connected to the battery 64 which is grounded at 65. In front of the lamp there is preferably a ground glass disk 66 bearing the normally invisible legend "Refill Chassis Lubricator" or equivalent words.

In operation, as long as the engine is running with lubricant in the reservoir P, pressure sustained by the valve 53 maintains diaphragm 43 deflected to open-circuit position. After the vehicle is put up say for the night and the bleeder valve 35' of the pump has relieved pressure, the contacts of the unit 41 are closed by spring 47 but no signal occurs at that time, since the ignition switch 63 is then open and the circuit between the battery and the lamp is not completed. Waste of storage battery current is thus avoided.

When, however, vehicle operation is resumed, the closure of the ignition switch causes the signal to flash, and pressure will not build up by pump operation when the reservoir is empty so that the contacts remain closed and the signal effective. If the lubricant should become depleted during a continuous run of the vehicle, then, a few minutes after such depletion has occurred the bleeder valve 35' will have sufficiently relieved the pressure so that the circuit closer 45—46 will make contact and the signal will light thus giving timely notice of the need for lubricant.

In the embodiment of Fig. 4 the oil is passed through the circuit closer head, through a shallow space preferably above the diaphragm as shown. The trapping of air is thus avoided, and oil pressure is promptly and uniformly transmitted through a relatively incompressible column of oil to the various drip plug outlets, without the fluctuations due to the alternate compression and expansion of trapped air.

The generic principle of the present invention particularly as embodied in Fig. 3 is shown applied to an intermittent or shot system embodiment as described in my copending application Serial No. 323,867 filed December 5, 1928.

Such application appears, in part, diagrammatically, in Fig. 6. The feed pump which may be of the same construction as that shown in Figs. 3 and 4 (and corresponding elements of which will be designated by the same reference numerals primed) is indicated at P' and the distributing piping leading to the drip plugs at $p'$. The valve $31^2$ has a bleeder seat as in the embodiment of Fig. 4. Between the feed pump and the piping there is interposed a unit U which I designate an accumulator. It may be briefly noted that this accumulator collects the successive minute charges delivered by the feed pump and only after a substantial charge has thus been accumulated does it snap open or release to allow said charge to be emitted into the distributing pipe system.

Since the details of this accumulator are not material to the invention claimed herein and are fully described in my copending application it need merely be briefly stated here that the accumulator has an inlet 79 supplied from pump P' through pipe $p''$ and a displaceable head 80 is urged by a coil spring 81 to discharge the lubricant through an outlet 82. The outlet is controlled by a valve 83 actuated by a spring toggle construction 84. The toggle is controlled by the head 80. When the discharge is completed, the toggle 84 snaps the valve 83 closed and after the spring 81 has been compressed due to the injection into the accumulator through inlet 79 of a succession of charges from pump P, and the head 80 has thus been moved to the limit of the accumulator charge, the toggle snaps the valve 83 open.

Thus there will be sustained throughout normal operation, in the pipe line $p''$ connecting the pump outlet and the accumulator inlet 79 a pressure determined by the strength of the accumulator spring 81. This pressure is indicated by a gauge G' as in the embodiment of Figs. 1 and 3 or by an electric control head as in the embodiment of Figs. 4 and 5.

It will be understood of course that for the gauge of Fig. 6 there may be substituted an electric circuit closer as in Figs. 4 and 5, responding to high pressure due to the loading valve, and permitting a signal lamp to light when the pressure becomes low.

It will be also understood that instead of the pressure gauge of Figs. 1 and 3, an electric circuit closer may be employed, controlling the circuit of a lamp or other electric signal or indicating device, said signal becoming effective upon low pressure.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

Having thus described my invention, what I claim as new and desire to secure by Letters Patent is:—

1. In a central lubricating system, the combination of a source of lubricant propulsive pressure, a pipe line, a branched distributing pipe system supplied therefrom, a device including an automatic system inlet trip valve controlling the lubricant propulsion into said distributing system from said pipe line and setting up a substantial counter pressure in the pipe line between the device and the system; and an indicator subjected to the lubricant pressure in the line between the pressure source and the trip valve device and registering when said pressure is being maintained in said system, said indicator forming a part of said lubricating system and said lubricating system being provided with means to relieve the lubricant pressure between said system inlet valve and said source during the intervals between lubrication operations to enable said indicator to return to indication of no pressure in the system.

2. In a central lubricating system the combination of a reservoir, a source of lubricant propulsive pressure, a branched distributing pipe system supplied therefrom, a system inlet trip valve controlling the propulsion of lubricant into the branched part of the distributing system, an outlet check valve at said source of pressure, a pressure storage passage between said check valve and said trip valve, and an indicator actuated by the pressure in said passage, said indicator forming a part of said lubricating system and said lubricating system being provided with means to relieve the lubricant pressure between said system inlet valve and said source during the intervals between lubrication operations to enable said indicator to return to indication of no pressure in the system.

3. In an automatic central chassis lubricating system, the combination of an intermittently operating pump, an oil reservoir supplying the latter, a distributing pipe system having flow controlling highly restricted proportioning outlets, a resiliently discharged accumulator adapted to collect the charges from said pump and automatically to emit into the distributing system therebeyond and indicating means connected between the pump and the accumulator.

4. In an automatic central lubricating system of the type comprising an intermittently operated pump, a lubricant reservoir supplying the same, a distributing piping system having branched highly restricted proportioning outlets, a resiliently discharged accumulator collecting the intermittent discharges from the pump and sustaining pressure; the combination therewith of indicator means comprising a gauge connected between the pump and the accumulator.

5. In an automatic central lubricating system of the type comprising an intermittently operated pump with an outlet, a lubricant reservoir supplying the same, a distributing piping system having branched outlets, an accumulator with an inlet including means to effect a resilient discharge and a conduit connecting the inlet of the latter to the outlet of the pump; the combination therewith of indicator means comprising a gauge connected with said conduit and bleeder means to slowly relieve the pressure after the pump has ceased operation.

6. In a chassis lubricating system, the combination of a pump energized during normal operation of a vehicle, a charge accumulator supplied from said pump, a distributing system, a trip valve controlling the emission from said accumulator to said distributing system, and a low level indicator subjected to the pressure stored between said pump and said trip valve and arranged to register the falling off of said pressure due to pump operation in the absence of a supply of lubricant.

7. In an installation of the character described, the combination of an automatic intermittently operated source of lubricant propulsive pressure, distributing piping connected therewith and having branched outlets, a valved chamber including a pressure responsive diaphragm controlled by the discharge from said pump to the distributing system therebeyond positioned ahead of said piping, indicator means and a circuit closer governing the latter and controlled by said diaphragm.

8. In an installation of the character described, the combination of an automatic intermittently operated source of pressure, distributing piping connected therewith and having outlet branches, indicator means including a circuit closer unit having a transverse spring urged diaphragm subjected to pressure generated by said pressure source and maintained thereby in open circuit condition, said unit having an inlet and a separate outlet at the upper side thereof whereby the lubricant is passed therethrough and trapping of air therein is avoided.

9. A circuit closer unit for the indicator of a centralized lubricating system comprising a capsule having a body and a cap, a diaphragm connected between said members, an electric circuit closer contact thereon, a contact in said body for cooperation therewith, said parts being constructed and arranged normally to retain said diaphragm in circuit closing position, said body having an inlet for admission of lubricant and a distinct outlet for escape of lubricant both said inlet and said outlet being in communication with the same face of the diaphragm.

10. In an installation of the character described, the combination of a source of liquid, a pressure pump, a pump actuating agency, a distributing system supplied from the pump having outlet branches, means in said system in advance of said outlets responding to pressure resulting from operation of said pump in the presence of liquid, electric circuit closer contacts controlled by said pressure responsive means and normally maintained open thereby, resilient means for closing the circuit through said contacts upon discontinuance of pump pressure during continued operation of the pump, an alarm in said circuit, and means for rendering the alarm circuit inactive when the pump is out of operation.

11. In a chassis lubricating system the combination of a lubricant distributing system comprising an automatic reciprocating pump supplying lubricant to said system, a valved chamber receiving the discharge from said pump, a spring valve controlling the exit from said chamber to the distributing system, an indicator including a contact unit having a movable contact subjected to the pressure between said pump and said spring valve and normally retained thereby in open circuit relation, and adapted to close the circuit as a result of operation of the system in the absence of a supply of lubricant from said pump.

12. In a chassis lubricating system, the combination of a lubricant distributing system comprising an automatic reciprocating pump supplying lubricant to said system, a valved chamber receiving the discharge from said pump, a spring valve controlling the exit from said chamber to the distributing system, an indicator including a contact unit having a movable contact subjected to the pressure between said pump and said spring valve and normally retained thereby in open circuit relation, and adapted to close the circuit as a result of operation of the system in the absence of a supply of lubricant from said pump, the source of energy for operating the indicator upon closure of the contacts being controlled from one of the electric accessories of the motor vehicle.

13. A chassis lubricating system supplying lubricant to a plurality of bearings comprising a lubricant reservoir, a lubricant pump interconnected with the operating vehicle for automatic operation thereby, a valved chamber supplied from said pump, a resilient discharge arrangement associated with said chamber, a branched distributing system leading therefrom to the bearings, a circuit closer between the pump and chamber and retained in open circuit position, a battery for energizing said indicator, and an ignition switch, one terminal of the circuit closer being in circuit with the ignition switch.

14. In a chassis lubricating system for an automotive vehicle with an electric installation, the combination of a source of lubricant propulsive pressure, a distributing system supplied therefrom, indicating means subjected to the lubricant pressure from said source, said indicating means including a storage chamber through which lubricant flows from said source to said system, said chamber being provided with a valved inlet, a valved outlet and a pressure relief means, electric means for operating said indicating means upon a drop of lubricant propulsive pressure from said source, said electric means being automatically energized by the electric installation of the vehicle, while the vehicle is in use.

15. In a chassis lubricating system for an automotive vehicle with an electric installation, the combination of a source of lubricant pressure, a distributing system supplied therefrom including pressure resistant outlets, indicating means subjected to pressure on said system, said indicating means including a storage chamber through which lubricant flows from said source to said system, said chamber being provided with a valved inlet, a valved outlet and a pressure relief means, electric means for operating said indicating means when the pressure on the system subsides, said electric means being automatically energized by the electric installation of the vehicle while the vehicle is in use.

16. In a centralized pressure lubricating system of the type in which the pressure in the branched distributing pipes during operation is variable and may become very low, a valved pressure chamber having inlet and outlet valve means in advance of the branches of the distributing system, said outlet valve means serving as a system inlet valve, and an indicator connected to respond to the pressure in said chamber, said indicator forming a part of said lubricating system and said lubricating system being provided with means to relieve the lubricant pressure between said system inlet valve and said source during the intervals between lubrication operations to enable said indicator to return to indication of no pressure in the system.

17. In a centralized lubricating system, a distributing pipe system having highly restricted drip plug outlets, means for intermittently injecting small charges into said system with such force as to cause the pressure to rise when the oil becomes thick, for substantially constant rate of emission to the bearings, a pressure chamber in said system in advance of the branches, and an indicator connected to respond to the pressure in said chamber, said system being provided with means to relieve the lubricant pressure in said pressure chamber during the intervals between lubrication operations.

18. In an installation of the character described, the combination of an automatic intermittently operated source of pressure, a distributing piping connected therewith and having outlet branches, indicator means including a chamber with a pressure responsive unit subjected to pressure generated by said pressure source, said chamber having an inlet and a separate outlet at the upper side thereof whereby the lubricant is passed therethrough and trapping of air therein is avoided.

19. In an installation of the character described, the combination of a source of lubricant propulsive pressure, a distributing system supplied therefrom and having flow controlling outlets, a discharge chamber at and between the outlet from the source and the inlet to the system, having inlet and outlet passages, each provided with a spring seated valve, the outlet valve serving as a system inlet valve and maintaining a pressure in said discharge chamber and both valves preventing reverse flow through said passages and an indicator controlled by the pressure in said chamber, said indicator forming a part of said lubricating system and said lubricating system being provided with means to relieve the lubricant pressure between said system inlet valve and said source during the intervals between lubrication operations to enable said indicator to return to indication of no pressure in the system.

20. In a system of the character described, a source of liquid, a pump associated therewith, branched distributing piping system leading therefrom, a discharge chamber at and between the outlet from the source and the inlet to the system, having inlet and outlet passages, each provided with a spring seated valve, the outlet valve serving as a system inlet valve and maintaining a pressure in said discharge chamber and both valves preventing reverse flow through said passages and an indicator controlled by the pressure in said chamber, said indicator forming a part of said lubricating system and said lubricating system being provided with means to relieve the lubricant pressure between said system inlet valve and said source during the intervals between lubrication operations to enable said indicator to return to indication of no pressure in the system.

21. An installation of the character described comprising a source of liquid, pressure generating means associated therewith, a piping system connected with said source and having outlet branches, a counter pressure device in said pipe system in advance of said branches determining a pressure trap, indicator means actuated by said counter pressure device, and automatic bleeder means associated with said counter pressure device slowly to relieve the pressure from said trap after the pressure generating means has ceased functioning.

22. An installation of the character described, comprising a source of lubricant, a pump associated therewith, a piping system connected with said pump and having outlet branches, a counter pressure device in said pipe system in advance of all of said branches, indicator means subject to the pressure of said counter pressure device and actuated thereby, said counter pressure device comprising a spring-seated valve, said valve having a highly restricted by-passage affording a leak.

23. An installation of the character described, comprising a source of lubricant, a pump associated therewith, a distributing system connected with said pump and having outlet branches, a counter-pressure arrangement in said pipe system in advance of all of said branches, indicator means subject to the pressure of said counter pressure arrangement and actuated thereby, said counter pressure arrangement comprising a valve controlling admission to the distributing system and having a seat and a highly restricted bypass affording a leak to slowly relieve pressure adjacent said seat, said pressure being relieved from said counter-pressure arrangement.

24. In an apparatus of the character described, the combination of a source of lubricant under pressure, a distributing system supplied therefrom, a connection including an outlet provided with a valve interposed between the source and the distributing system, said valve closing said outlet whereby a substantial counter pressure is set up in the connection upon feed of lubricant under pressure thereinto from said source, and pressure responsive indicating means actuated by said counter pressure, said apparatus being provided with means to relieve the lubricant pressure from said connection, said apparatus being provided with means to operate said valve at intervals to permit lubricant to flow into said distributing system.

25. In a central lubricating installation, a branch conduit system having a single inlet and a plurality of outlets, said inlet including an indicator connection for indicating the pressure in said system, means for injecting lubricant under pressure through said inlet, means maintaining the conduit system substantially filled with lubricant and valve means upon said inlet regulating the flow of lubricant injected into said system through said inlet and substantially preventing reverse flow through said inlet, said valve having a highly restricted leaky construction to relieve lubricant pressure in the pipe system.

26. In a central lubricating installation, a branch conduit system having a single inlet and a plurality of outlets, said inlet including an indicator connection for indicating the pressure in said system, means for injecting lubricant under pressure through said inlet, means maintaining the conduit system substantially filled with lubricant and valve means at said inlet having a leaky construction to relieve lubricant pressure in the connection, said injecting means consisting of a pump and said valve means serving as the pump outlet valve.

27. In a central lubricating installation, a branch conduit system having a single inlet and a plurality of outlets, said inlet including an indicator connection for indicating the pressure in said system, means for injecting lubricant under pressure through said inlet, means maintaining the conduit system substantially filled with lubricant and valve means at said inlet having a leaky construction to relieve lubricant pressure in the connection, a reservoir being provided and said valve means being so constructed and arranged as to permit leakage from said inlet to said reservoir.

28. In a lubricating installation, a lubricant supply, a pump, a distribution system, an accumulator for receiving lubricant from said pump and supplying it to said system and means for slowly dissipating or relieving lubricant pressure between said pump and said accumulator after stoppage of the pumping means.

JOSEPH BIJUR.